United States Patent [19]
Sabee et al.

[11] 3,949,130
[45] Apr. 6, 1976

[54] SPUN BONDED FABRIC, AND ARTICLES MADE THEREFROM

[75] Inventors: Reinhardt N. Sabee, Appleton; Eckhard C. Schwarz, Neenah, both of Wis.

[73] Assignee: Tuff Spun Products, Inc., Appleton, Wis.

[22] Filed: Jan. 4, 1974

[21] Appl. No.: 430,849

[52] U.S. Cl. ............... 428/192; 128/284; 128/296; 156/167; 264/210 F; 428/284; 428/290; 428/296; 428/301; 428/409
[51] Int. Cl.² .......................................... B32B 7/04
[58] Field of Search ......... 264/210 F; 161/150, 151, 161/152, 156, 157; 156/167, 166; 128/284, 287, 290 R, 296; 428/192, 284, 290, 296, 301, 409

[56] References Cited
UNITED STATES PATENTS

| | | | |
|---|---|---|---|
| 3,067,747 | 12/1962 | Wolterding et al. | 128/296 |
| 3,338,992 | 8/1967 | Kinney | 264/24 |
| 3,341,394 | 9/1967 | Kinney | 128/284 |
| 3,502,763 | 3/1970 | Hartmann | 264/290 R |
| 3,507,943 | 4/1970 | Such et al. | 264/103 |
| 3,554,854 | 1/1971 | Hartmann | 161/150 |
| 3,692,618 | 9/1972 | Dorschner et al. | 161/150 |
| 3,770,562 | 11/1973 | Newman | 161/167 |
| 3,795,571 | 3/1974 | Prentice | 161/150 |

*Primary Examiner*—William J. Van Balen
*Assistant Examiner*—James J. Bell
*Attorney, Agent, or Firm*—Henry C. Fuller

[57] ABSTRACT

A spun bonded web of substantially continuous synthetic filaments has one side that is at least two times smoother than the other side. The majority of the filament cross points within the web are fuse bonded during the web spinning process. The web is spun by blowing a line of spaced, molten synthetic filaments onto a smooth collecting surface which is in motion substantially transverse to the direction of flow of the filaments. The filaments are still soft when they contact the collecting surface and flatten against the collecting surface to form the smooth side of the web. On the other side of the web, the filaments are randomly entangled to form the rough side of the web. A disposable diaper or like article is formed by covering at least one side of an absorbent pad with the fabric of this invention, the rough side of the fabric facing the absorbent pad and serving to anchor the pad against bunching, splitting, or separating. The rough side of the fabric preferably also acts as a moisture carrier for wicking moisture through the fabric and into the absorbent pad. The smooth side of the fabric provides a smooth outer surface for comfortable contact with the baby's skin. The fabric of this invention can also be used as a covering for pillow cases, carpet underlay pads, mattress pads, quilts, insulated clothing, sleeping bags, cushioning materials, insulating materials, industrial air filters, liquid filters, under pads, towels, sheets, gowns, non-adherent dressings, and other articles utilizing a fabric which has one rough side and one smooth side.

13 Claims, 14 Drawing Figures

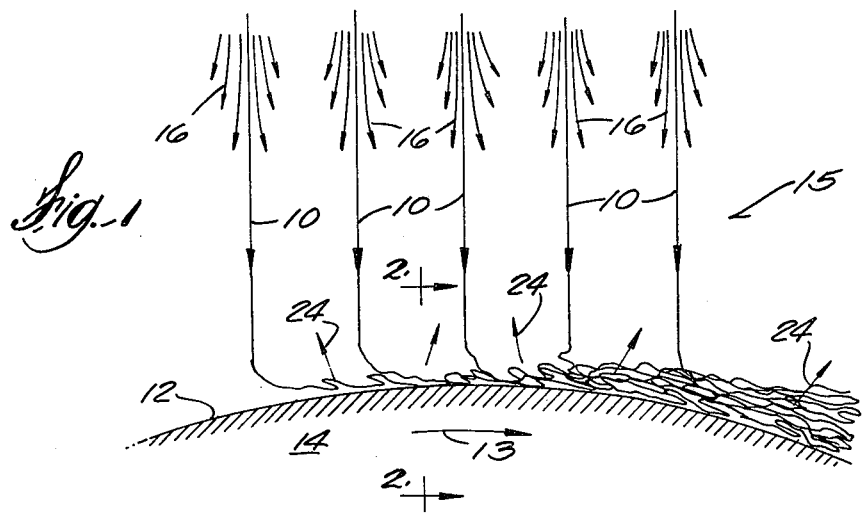
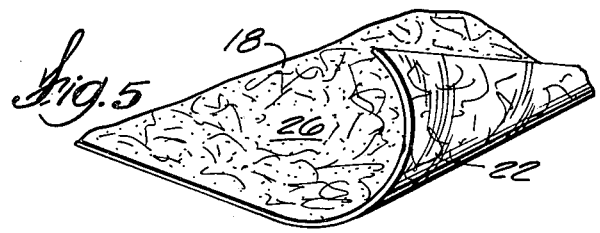
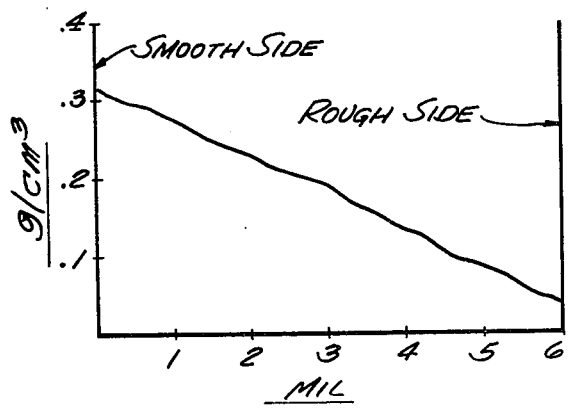
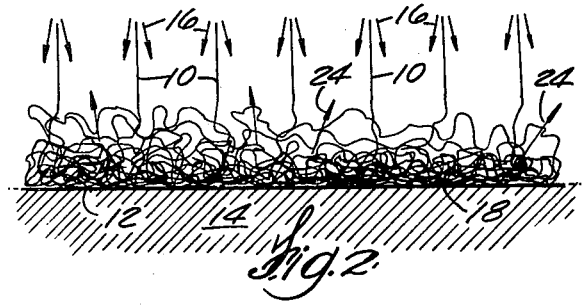
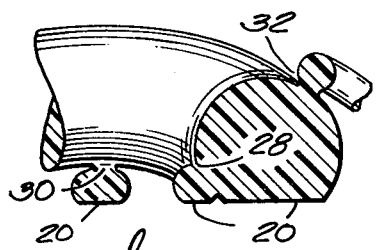
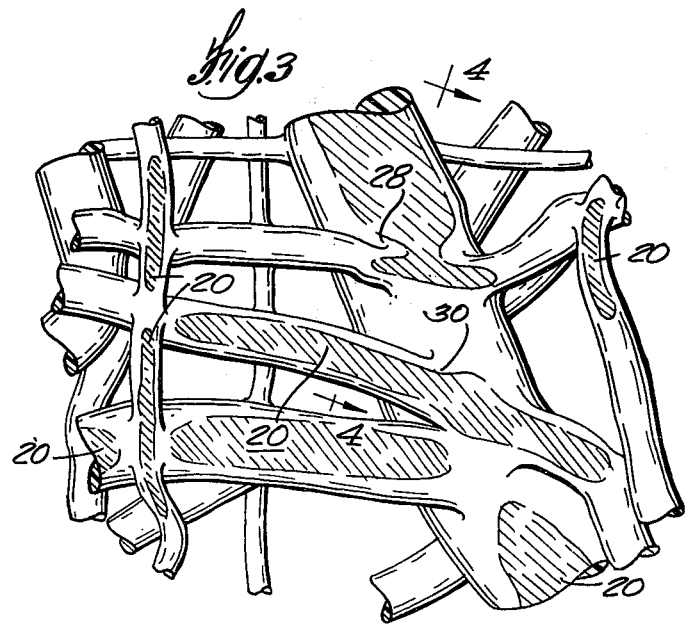

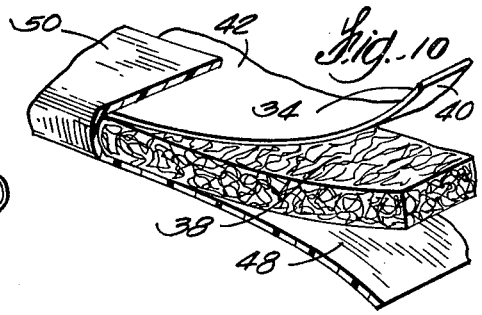
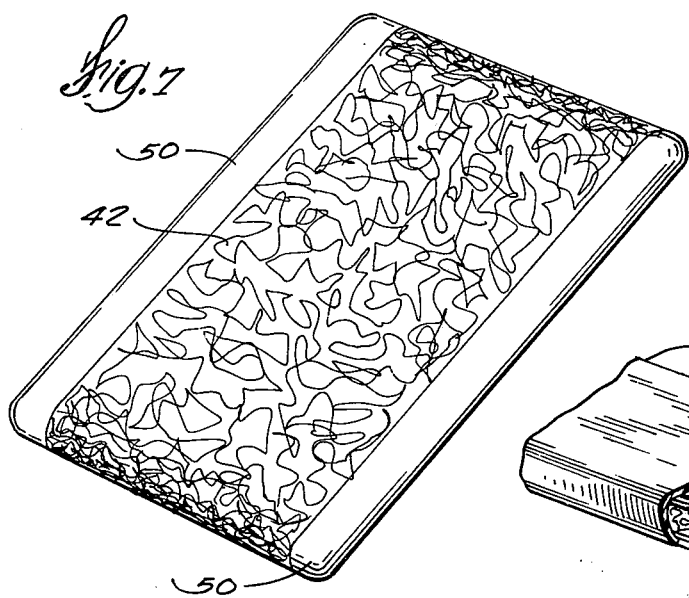
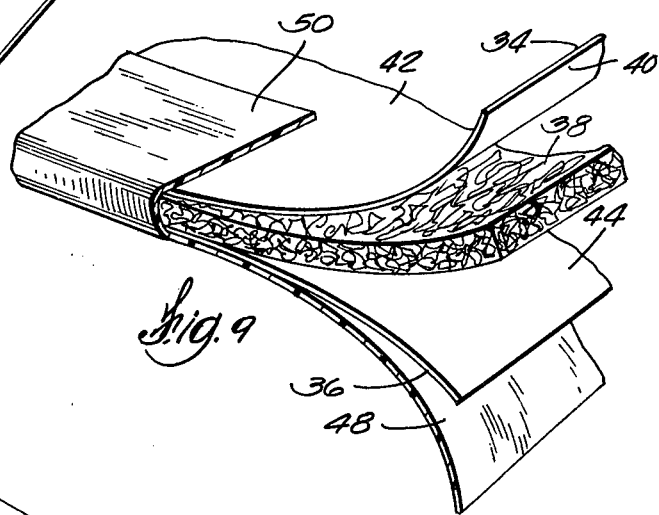
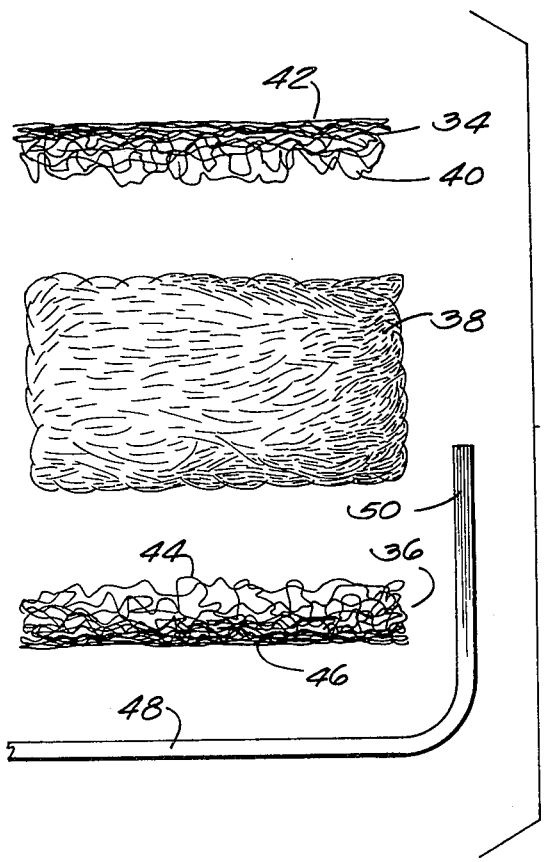

SPUN BONDED FABRIC, AND ARTICLES MADE THEREFROM

BACKGROUND OF THE INVENTION

This invention relates in general to the manufacture and use of non-woven fabrics. Typical prior art fabrics are disclosed in the following patents: Mesek et al., U.S. Pat. No. 3,483,051; Vosburgh, U.S. Pat. No. 3,459,627; Hartman, U.S. Pat. No. 3,502,763; Hartmann, U.S. Pat. No. 3,565,729; Vogt et al., U.S. Pat. No. 3,689,342; and Prentice, U.S. Pat. No. 3,704,198. These patents disclose various methods of manufacturing non-woven fabrics which have approximately the same degree of smoothness on one side as on the other. By way of contrast, the fabric of this invention is at least two times as smooth on one side as on the other. The prior art fabrics are made of discrete fibers while the fabric of this invention is made of substantially continuous filaments. The prior art fabrics are substantially uniform in density while the fabric of this invention is approximately twice as dense on the smooth side as on the rough side. The extruded fibers in the prior art spinning apparatus are allowed to solidify before they strike the collecting surface. In the method of this invention, the extruded filaments are blown against a smooth collecting surface while the filaments are still soft, whereby the filaments flatten at their points of contact with the collecting surface and form a smooth surface. In the past, disposable diapers and similar articles have been manufactured using one or more layers of cellulose tissue which makes the diaper relatively stiff and boardy to the feel. This stiffness chafes the baby's skin and is one cause of diaper rash. Also, these prior art diapers tend to split and bunch up because the cellulose tissue layers do not have sufficient wet strength to absorb stresses that they are subjected to during handling of or movement by the baby. The fabric of this invention eliminates these boardy cellulose tissue layers and makes it possible to replace them with a fluffy pad of air laid absorbent fibers adjacent to the rough side of the fabric, which anchors the pad against bunching, splitting, or separating. The smooth side of the fabric provides comfortable contact against the baby's skin. The fabric of this invention is also relatively strong and stretchable so that it can yield in response to the baby's movements.

SUMMARY OF THE INVENTION

A spun bonded web of substantially continuous synthetic filaments has one side that is at least two times smoother than the other side. The majority of the filament cross points within the web are fuse bonded during the web spinning process. The web is spun by blowing a line of spaced, molten synthetic filaments onto a smooth collecting surface which is in motion substantially transverse to the direction of flow of the filaments. The filaments are still soft where they contact the collecting surface. Therefore, the filaments flatten against the collecting surface to form the smooth side of the web. On the other side of the web, the filaments are randomly entangled to form the rough side of the web. A disposable diaper or like article is formed by covering at least one side of an absorbent pad with the fabric of this invention, the rough side of the fabric facing the absorbent pad and serving to anchor the pad against bunching, splitting, or separating. The rough side of the fabric preferably also serves as a moisture carrier for wicking moisture through the fabric and into the absorbent pad. The smooth side of the fabric provides a smooth outer surface for comfortable contact with the baby's skin. The fabric of this invention can also be used as a covering for pillow cases, carpet underlay pads, mattress pads, quilts, insulated clothing, sleeping bags, cushioning materials, insulating materials, industrial air filters, liquid filters, under pads, towels, sheets, gowns, non-adherent dressings, and other articles in which such fabric has utility.

One object of this invention is to provide a novel non-woven fabric or web that is significantly smoother on one side than on the other.

Another object of this invention is to provide a novel non-woven fabric or web that is made of substantially continuous filaments rather than discrete fibers.

A further object of this invention is to provide a novel spun bonded fabric or web in which the majority of the fiber cross points are fuse bonded during the spinning operation.

An additional object of this invention is to provide a novel spinning process for manufacturing the above-described novel fabric or web.

A further object of this invention is to provide a novel spinning process in which substantially continuous filaments of molten synthetic resin are blown against a smooth collecting surface while the filaments are still soft enough to flatten against the collecting surface and form a fabric or web surface which is as smooth as the collecting surface.

An additional object of this invention is to provide a soft, body conformable disposable diaper which does not require pleats to conform to the baby's contours.

Another object of the invention is to provide a facing sheet or envelope for an absorbent disposable diaper pad, the facing sheet or envelope being stretchable and yieldable in complete compatability with the plastic backing of the diaper without splitting, tearing, or bunching up.

An additional object of this invention is to provide a hydrophobic facing sheet or envelope which is stretchable to conform to the contours of a person in contact therewith, the facing sheet or envelope being free from all binders used in dry process non-woven materials.

A further object of this invention is to provide a facing sheet for an absorbent diaper pad, the smooth side of the facing sheet being outermost where it contacts the baby's skin, and the rough side being adjacent to the absorbent pad so as to cause the absorbent pad to cling to the facing sheet at all times during the baby's actions. The clinging and stretching qualities of the facing sheet allow the baby to go through any motion without splitting, shifting or bunching the absorbent pad in the crotch section.

Another object of this invention is to provide a diaper pad facing sheet which is smooth on the side that contacts the baby's skin and which is rough on the side that contacts the diaper pad and has fiber loops, particles, or ends projecting into the absorbent pad to provide rapid wicking of fluids into the body of the absorbent pad.

A further object of this invention is to provide an absorbent pad which is faced on at least one side by a fabric which is rough enough on one side to anchor the fibers of the absorbent pad against bunching and to act as a moisture carrier for wicking moisture through the fabric and into the absorbent pad, the other side of the fabric being smooth enough for comfortable contact with a person's skin.

Other objects, advantages and features of the invention will become apparent to those skilled in the art from the description which follows.

DESCRIPTION OF THE DRAWINGS

FIG. 1 is a diagrammatic representation of means for practicing the method of this invention.

FIG. 2 is a cross sectional view taken on the line 2—2 of FIG. 1.

FIG. 3 is a greatly enlarged fragmentary view of the smooth side of the fabric or web of this invention.

FIG. 4 is a cross sectional view taken on the line 4—4 of FIG. 3.

FIG. 5 is a perspective view of a portion of the fabric or web of this invention.

FIG. 6 is a graph showing the variation of density from the smooth side to the rough side of the fabric or web of this invention.

FIG. 7 is a perspective view of one illustrative disposable diaper of this invention.

FIG. 8 is a fragmentary, enlarged, exploded cross-sectional view of a portion of the diaper shown in FIG. 7.

FIG. 9 is a fragmentary exploded perspective view of the embodiment illustrated in FIGS. 7 and 8 with the side edge portion of the moisture proof backing sheet cut away to reveal the structure of the diaper pad.

FIG. 10 is a fragmentary exploded perspective view similar to FIG. 9 showing a modification of the diaper pad disclosed in FIGS. 7 – 9, the side edge portion of the moisture proof backing sheet being cut away to reveal the structure of the diaper pad.

DESCRIPTION OF THE PREFERRED EMBODIMENTS

Figure 11:
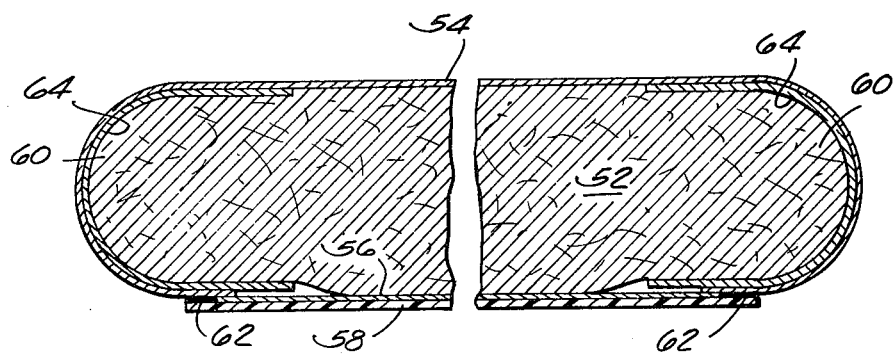
FIG. 11 is a cross-sectional view of a third diaper pad of this invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 and 2, the method of this invention involves blowing spaced, molten synthetic filaments 10 onto a smooth collecting surface 12 which may be the surface of a polished chromium plated metal cylinder 14 or the like. The collection surface 12 is moving transversely with respect to the direction of flow of filaments 10 as indicated by the arrow 13 in FIG. 1. Each of the filaments 10 may be extruded from a suitable prior art extruder head (not shown) and each filament 10 is enveloped and propelled through a zone 15 by a relatively high speed hot air stream 16 which is produced by a suitable prior art blower, heater, and nozzle arrangement (not shown). Alternately, the filaments 10 could be drawn off rolls and melted by suitable radiant or convection heaters (not shown). The diameter of the filaments 10 is within the range of ½ to 30 microns. The velocity of air streams 16 is within the range of 50 to 350 meters per second. The filaments 10 are molten where they leave the extruder head orifices and enter zone 15. The temperature of the air streams 16 is above the melting temperature of filaments 10 at the point where the air streams 16 initially contact the filaments 10 in zone 15. However, the arrangement is such that the temperature of air streams 16 falls below the melting temperature of filaments 10 as the filaments move through zone 15 before the filaments 10 strike either the collecting surface 12 or the surface of the web 18 deposited thereon.

The collection surface 12 is positioned close enough to the source of the molten filaments 10 so that the filaments 10 are still soft when they make contact with the collection surface 12. Therefore, the portions of the filaments 10 which contact collection surface 12 are flattened as shown in FIGS. 3 and 4. The shaded areas 20 in FIG. 3 correspond to the flattened areas 20 in FIG. 4. This flattening results from the fact that the filaments 10 are moving relatively rapidly toward collection surface 12 and are still soft when they strike collection surface 12.

After striking the collection surface 12, the air streams 16 are deflected upwardly as indicated by arrows 24 in FIGS. 1 and 2. These upwardly deflected air streams 24 are randomly oriented since they are deflected in part by the curved surfaces of the filaments 10 which have piled up on the upper or rough surface of web 18. The upwardly deflected air streams 24 thus cause the filaments 10 to pile up on top of each other in a randomly entangled manner as indicated in FIGS. 1 and 2 to form the web 18 with one smooth side 22 and one rough side 26. The rough side 26 of web 18 is formed by the upper side of the randomly entangled filaments 10 which are deposited on top of web 18.

As the molten filaments 10 are propelled toward the collecting surface 12 through zone 15 and are piled up on the top of web 18, the filaments 10 may become stretched out, which reduces their diameters as indicated by the different diameters of the fibers shown in FIGS. 3 and 4. The filaments 10 may be occasionally broken during movement to the collecting surface 12. It is, however, preferable for the filaments 10 to remain continuous, although occasional breaks are tolerable.

Inasmuch as the filaments 10 are still soft when reaching the collecting surface 12, as the filaments 10 pile up on the web 18, the filament cross points tend to fuse together as indicated at cross points 28, 30, and 32 in FIGS. 3 and 4. This enhances the strength of the web 18. The conditions under which the web 18 is spun are preferably such as to fuse bond the majority of the filament cross points. Typical spinning conditions are noted hereinafter. The smooth side 22 of the web has a greater percentage of fused cross points than the rough side 26.

The fabric or web 18 of this invention in not uniform in density but is rather approroximately twice as dense on the smooth side 22 as on the rough side 26 as shown in the density chart in FIG. 6. Greater density gradients could be produced if desired by a multiple pass technique whereby in the first pass, the collecting surface 12 is relatively close to the source of the molten filaments 10, but on subsequent passes, the distance between the collecting surface 12 and the source of molten filaments 10 is progressively enlarged. The basis weight of the web is preferably between 5 and 100 grams per square yard.

The degree of smoothness or roughness of the surfaces 22 and 26 of web 18 is determined by measuring the deviation of a relatively small area of 100 × 100 microns of the surface from a perfect plane. This may be done by making measurements on greatly enlarged photographs of the surface made with a microscope of known magnification. In the case of the smooth side of the web 18, the deviation of the flattened areas of the surface fibers from a perfect plane may also be assumed to be the same as the measured smoothness of the collecting surface, inasmuch as the smooth side 22 of the web 18 is flattened against the collecting surface 12 and thus faithfully adopts its characteristics along the line of the contact.

Because of the pliable nature of the web, the collection surface may be a cylinder rather than an ideal plane, the web being subsequently flattened. The degree of smoothness of the web is determined by the degree of smoothness of a small area of the collecting surface, said area being allowed to have a certain curvature in one or more direction. In a typical example, the flattened areas of the surface fibers of the smooth side 22 of the web 18 may conform to a plane within approximately five microns over an area of 100 × 100 micron$^2$, said area having a curvature radius of greater than 50 microns, and an angle of approximately 45 to 90° in respect to the impingement of the fibers, and the radius of the cylinder forming the collecting surface being greater than 5 cm. The general plane of the collecting surface in the area of the impingement of the filaments can deviate from a transverse direction by 45°.

It should be noted that the measurement of smoothness employed herein, i.e., the deviation of the surface from a perfect plane, is also a measurement of roughness, so that the relationship between the smooth side 22 and rough side 26 of web 18 can be expressed by saying that the smooth side is at least two times smoother than the rough side, and can also be expressed by saying that the rough side is at least three times rougher than the smooth side. These two statements have the same meaning in terms of the measurement for smoothness employed herein.

The measurements for smoothness and roughness noted above apply only to areas of the fabric 18 which are relatively small. A relatively large area has enough drapeability to adopt the curvature of the surface upon which it rests. In the case of the cylindrical collection surface 12, the radius of the cylinder 14 is sufficiently large so that the small area that is taken as a unit of measurement for smoothness is a good approximation to a plane surface.

Another characteristic of this web is that a larger number of filament cross points are bonded on the smooth side than on the rough side. By means of inspection under the microscope it has been found that about 50% or less of the filament cross points are fuse bonded on the rough side, while approximately 70% or more are bonded on the smooth side.

The material used for the filaments 10 may be polypropylene, polyethylene, nylon, or other suitable synthetic resins. The spinning conditions may be varied in accordance with the desired characteristics of the spun web. Typical spinning conditions are listed below for several exemplary webs.

Example No. 1

| | |
|---|---|
| (1) | Material: Polypropylene (Profax - 643A) |
| (2) | Diameter of filaments: ½ - 20 microns |
| (3) | Number of filaments: 70 |
| (4) | Space between extrusion nozzles: ⅜ inch |
| (5) | Temperature of filaments at extrusion orifice: 650°F. |
| (6) | Air velocity at extrusion orifice: 350 yard/sec. |
| (7) | Air temperature at extrusion orifice: 700°F. |
| (8) | Distance from extrusion orifice to collecting surface: 12 inches |
| (9) | Collecting surface material: chrome plated steel |
| (10) | Flatness of collecting surface: 0.25 micron deviation from perfect plane |
| (11) | Velocity of collecting surface: 35 feet/minute |

The fabric or web produced under the above conditions had the following characteristics:

| | |
|---|---|
| (A) | Basis weight: 28 grams/yard$^2$ |
| (B) | Average density: 0.225 grams/cm$^3$ |
| (C) | Density on smooth side: 0.3 grams/cm$^3$ |
| (D) | Density on rough side: 0.08 grams/cm$^3$ |
| (E) | Smoothness of smooth side: 0.25 micron deviation from perfect plane |
| (F) | Smoothness of rough side: 2.0 micron deviation from perfect plane |

Example No. 2

| | |
|---|---|
| (1) | Material: Nylon 6-6 |
| (2) | Diameter of filaments: 1–30 microns |
| (3) | Number of filaments: 70 |
| (4) | Space between extrusion nozzles: ⅜ inch |
| (5) | Temperature of filaments at extrusion orifice: 554°F. |
| (6) | Air velocity at extrusion orifice 350 yard/sec. |
| (7) | Air temperature at extrusion orifice: 600°F. |
| (8) | Distance from extrusion orifice to collecting surface: 8 inches |
| (9) | Collecting surface material: chrome plated steel |
| (10) | Flatness of collection surface: 5 micron deviation from perfect plane |
| (11) | Velocity of collecting surface: 35 feet/minute |

The fabric or web produced under the above conditions had the following characteristics:

| | |
|---|---|
| (A) | Basis weight: 20 grams/yard$^2$ |
| (B) | Average density: 0.18 grams/cm$^3$ |
| (C) | Density of smooth side: 0.4 grams/cm$^3$ |
| (D) | Density of rough side: 0.10 grams/cm$^3$ |
| (E) | Smoothness of smooth side: 5 micron deviation from perfect plane |
| (F) | Smoothness of rough side: 20 micron deviation from perfect plane |

Example No. 3

| | |
|---|---|
| (1) | Material: Polyethylene terephthalate (intrinsic viscosity = 0.65) |
| (2) | Diameter of filaments: ½ - 10 microns |
| (3) | Number of filaments: 70 |
| (4) | Space between extrusion nozzles: ⅜ inch |
| (5) | Temperature of filaments at extrusion orifice: 560°F. |

-continued
Example No. 3

| | | |
|---|---|---|
| (6) | Air velocity at extrusion orifice: | 300 yard/second |
| (7) | Air temperature at extrusion orifice: | 600°F. |
| (8) | Distance from extrusion orifice to collecting surface: | 12 inches |
| (9) | Collecting surface material: | chrome plated steel |
| (10) | Flatness of collecting surface: | 0.25 deviation from perfect plane |
| (11) | Velocity of collecting surface: | 35 feet/minute |

The fabric or web produced under the above conditions had the following characteristics:

| | | |
|---|---|---|
| (A) | Basis weight: | 2 grams/yard$^2$ |
| (B) | Average density: | 0.20 grams/cm$^3$ |
| (C) | Density of smooth side: | 0.35 grams/cm$^3$ |
| (D) | Density of rough side: | 0.10 grams/cm$^3$ |
| (E) | Smoothness of smooth side: | 0.25 micron deviation from a perfect plane |
| (F) | Smoothness of rough side: | 1.5 micron deviation from perfect plane |

FIGS. 7 – 13 illustrate several different types of disposable diapers that utilize the novel fabric of this invention. For use in disposable diapers, the novel fabric of this invention is preferably treated with a wetting agent such as polyethylene glycol which has a molecular weight of below 2,000. The wetting agent wicks moisture through the fabric and into an absorbent pad as will be described hereinafter.

Referring to FIGS. 7 – 9, the novel fabric of this invention may be used as a facing sheet 34 and as an inner backing sheet 36 for a pad of absorbent fibers 38. The rough side 40 of facing sheet 34 is positioned facing the absorbent pad 38 so as to anchor the pad against bunching, splitting, or separating, and also to serve as a moisture carrier for wicking moisture through facing sheet 34 and into absorbent pad 38. The smooth side 42 of facing sheet 34 is directed away from absorbent pad 38 and serves to provide a smooth surface for comfortable, chafe-free contact with the baby's skin. The rough side 44 of inner backing sheet 36 is oriented toward absorbent pad 38 for anchoring the same and the smooth side 46 is directed outwardly and contacts an outer backing sheet 48 which is made of moisture impervious plastic and serves to keep the back of the diaper dry. The side edges 50 of outer backing sheet 48 are folded over the edges of the diaper pad and are overlapped over the inner surface 42 of facing sheet 34 as shown in FIGS. 7 and 9. The various fabric layers are joined together to form the diaper pad in accordance with well known prior art techniques.

In the above described diaper construction, the novel fabric of this invention is placed adjacent to both the inner and outer faces of absorbent pad 38 to securely anchor the absorbent fibers against bunching, splitting, and separating. However, it is possible to omit the inner backing sheet 36 if desired and to form a diaper pad such as shown in FIG. 10 in which the inner surface of plastic backing sheet 48 is directly adjacent to the absorbent pad 38.

Figure 12:
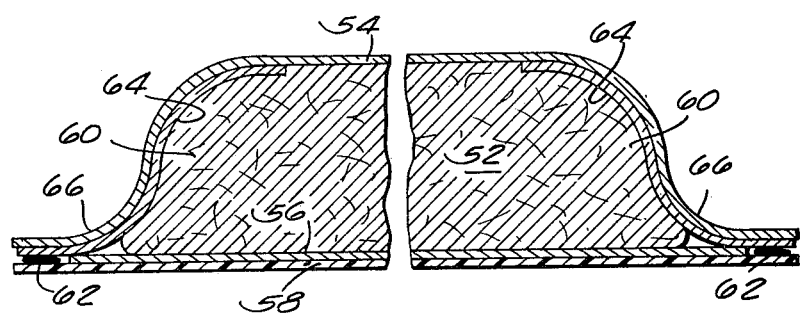
FIG. 12 is a cross-sectional view of a fourth diaper pad of this invention.
Figure 13:
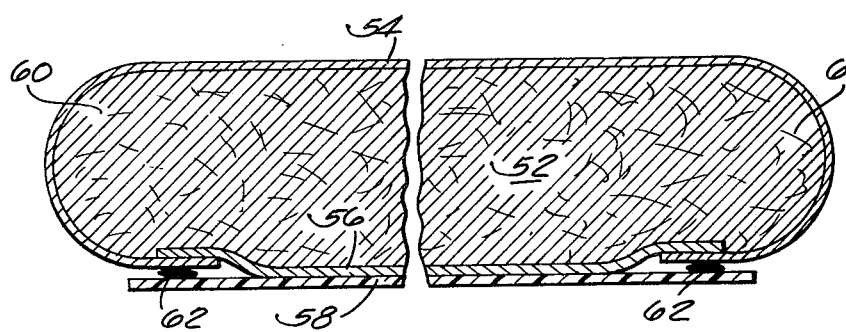
FIG. 13 is a cross-sectional view of a fifth diaper pad of this invention.

FIGS. 11 – 13 show several edge seal configurations that can be used in the diaper construction of this invention. In each of these embodiments, the basic diaper is formed by an absorbent pad 52, a facing sheet 54 and an inner backing sheet 56, both comprising the novel fabric of this invention oriented with the rough surface thereof facing absorbent pad 52, and a moisture impervious outer backing sheet 58.

In the arrangement of FIG. 11, the facing sheet 54 extends around both side edges 60 of the diaper and are fastened to the margin of outer backing sheet 58 by cement strips 62. A pair of inner side edge seals 64 are provided underneath the side edges of facing 54. Side edge seals 64 are made of flexible, moisture impervious plastic material which is lighter in weight than the outer backing sheet 58, which has to be relatively thick for adequate pin anchorage strength.

In the arrangement of FIG. 12, the side edge portions of facing sheet 54 and edge seals 64 are turned up at 66 and are cemented together by suitable cement such as the cement strip 62.

The arrangement of FIG. 13 is similar to that of FIG. 11 with the side edge seals 64 left out. The facing sheet 54 is bent down and over the side edges 60 of the diaper and are fastened to the margins of inner backing sheet 56 and outer backing sheet 58 by cement strips 62.

Figure 14:
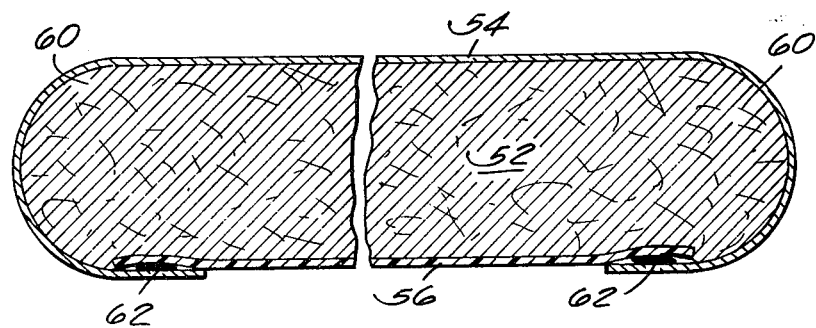
FIG. 14 is a cross-sectional view of another absorbent pad of this invention.

FIG. 14 shows a construction in which the absorbent pad 52 is covered by facing sheet 54 and backing sheet 56, the side edges of facing sheet 54 being extended around the side edges 60 of pad 52 and being fastened to backing sheet 56 by adhesive strips 62. This configuration is suitable for use in connection with a carpet underlay pad, mattress pad, quilt, insulated clothing, sleeping bags, cushioning materials, insulating materials, industrial air filters, liquid filters, under pads, non-adherent dressings, and other articles utilizing an absorbent pad covered on both sides by the novel fabric of this invention with the rough side of the fabric facing the absorbent pad to anchor the pad.

What is claimed is:

1. A spun bonded two sided fabric of substantially continuous filaments, said filaments having a thickness of ½ to 100 microns, said fabric having one smooth side with surface filaments flattened in the plane of the fabric surface for portions of their length, and wherein more than 70% of the filament cross-over points are bonded on the smooth side of the fabric, and less than 50% of the filament cross-over points are bonded on the opposite rougher side of the fabric, and wherein the fabric density on the smooth side is more than 10% higher than the average fabric density, and the fabric density on said opposite side is more than 10% lower than the average fabric density.

2. The fabric defined in claim 1 wherein the fabric density on the smooth side is more than 20% higher than the average fabric density, and the fabric density on said opposite rougher side is more than 20% lower than the average fabric density.

3. The fabric or web defined in claim 1 wherein the basis weight of said fabric or web is within the range of 5 to 100 grams per square yard.

4. A fabric in accordance with claim 1 in combination with a relatively flexible, absorbent pad of fibrous material said fabric forming a facing sheet with said rough side of said fabric engaging the fibers of said absorbent pad and anchoring them against bunching, splitting, or separating when the pad is flexed.

5. The combination defined in claim 4 wherein the smooth side of said facing sheet is smooth enough for comfortable contact with a person's skin.

6. The combination defined in claim 4 wherein said facing sheet is coated with polyethylene glycol to act as a moisture carrier for wicking moisture through said facing sheet and into said absorbent pad.

7. The combination defined in claim 4 and further comprising a moisture impervious backing sheet on the side of said absorbent pad opposite said facing sheet.

8. The combination defined in claim 4 and also comprising a fabric backing sheet that has one surface which is rough enough to anchor the fibers of said absorbent pad against bunching, splitting or separating when the pad is flexed, the rough surface of the backing sheet being in contact with the adjacent surface of said absorbent pad.

9. The combination defined in claim 8 and further comprising a water impervious backing sheet in contact with the outer surface of said fabric backing sheet.

10. The combination defined in claim 9 and further comprising a pair of side edge seals which are made of moisture impervious material and which are positioned over opposing side edges of said absorbent pad.

11. The combination defined in claim 10 wherein said fabric facing sheet extends around and over said side edge seals.

12. A fabric in accordance with claim 1 in combination with a non-adherent dressing having an absorbent pad said fabric comprising a facing sheet covering at least one side of the absorbent pad, and wherein said fabric facing sheet adjacent to said pad is rough enough to have projections embedded into said pad.

13. The combination defined in claim 12 and further comprising a moisture impervious backing sheet on the side of said absorbent pad opposite said facing sheet.

* * * * *